United States Patent
Sebastian et al.

(10) Patent No.: US 8,024,088 B2
(45) Date of Patent: Sep. 20, 2011

(54) REAR STEERING SENSOR DIAGNOSTIC ALGORITHM FOR FOUR-WHEEL STEERING SYSTEMS

(75) Inventors: Reeny T. Sebastian, Saginaw, MI (US);
Karen A. Boswell, Freeland, MI (US);
Brian D. Lemanski, Linwood, MI (US)

(73) Assignee: Nexteer (Beijing) Technology Co., Ltd.

( * ) Notice: Subject to any disclaimer, the term of this patent is extended or adjusted under 35 U.S.C. 154(b) by 2064 days.

(21) Appl. No.: 09/989,486

(22) Filed: Nov. 20, 2001

(65) Prior Publication Data

US 2003/0028302 A1    Feb. 6, 2003

Related U.S. Application Data

(60) Provisional application No. 60/309,434, filed on Aug. 1, 2001.

(51) Int. Cl.
*B62D 6/00* (2006.01)
(52) U.S. Cl. .............. 701/41; 701/43; 701/34; 180/445; 340/438
(58) Field of Classification Search .................... 701/41, 701/42, 43, 29, 34; 180/402, 410, 412, 415, 180/443, 445; 340/438
See application file for complete search history.

(56) References Cited

U.S. PATENT DOCUMENTS

| | | | |
|---|---|---|---|
| 4,939,653 A * | 7/1990 | Tsurumiya et al. | 701/41 |
| 4,972,320 A | 11/1990 | Sugiura et al. | 180/446 |
| 5,554,969 A * | 9/1996 | Eguchi | 340/438 |
| 6,354,396 B1 * | 3/2002 | Horton et al. | 180/446 |
| 6,364,050 B1 * | 4/2002 | Horton | 180/446 |
| 6,374,941 B1 * | 4/2002 | Forborgen | 180/444 |
| 6,411,876 B1 | 6/2002 | Badenoch | |
| 6,429,780 B1 * | 8/2002 | Yazawa et al. | 340/686.3 |
| 6,498,971 B2 * | 12/2002 | Leaphart | 701/41 |
| 6,502,025 B1 * | 12/2002 | Kempen | 701/41 |
| 6,552,534 B2 * | 4/2003 | Desbiolles et al. | 324/207.25 |
| 6,577,957 B2 * | 6/2003 | Fujimoto et al. | 702/36 |
| 6,594,563 B1 * | 7/2003 | Ding | 701/34 |
| 2001/0016791 A1 * | 8/2001 | Bolzmann et al. | 701/34 |
| 2003/0114969 A1 * | 6/2003 | Dominke et al. | 701/41 |

FOREIGN PATENT DOCUMENTS

JP        08282520 A  * 10/1996

* cited by examiner

*Primary Examiner* — John Q Nguyen
*Assistant Examiner* — Brian J Broadhead
(74) *Attorney, Agent, or Firm* — Cantor Colburn LLP

(57) ABSTRACT

A method for controlling the rear steering angle of a vehicle includes receiving a plurality of signals indicative of rear steering angle; checking at least one of the plurality of signals to determine if it falls within a valid range; correlating at least a first signal of the plurality of signals with at least a second signal of the plurality of signals to determine if either the first signal or the second signal is invalid; and rejecting any signals found to be invalid.

16 Claims, 4 Drawing Sheets

| WINDOW | ABSOLUTE SIGNAL |
|---|---|
| SIGNAL WINDOW (−2) | Between 0.25 V and 1 V |
| SIGNAL WINDOW (−1) | Between 1 V and 2 V |
| SIGNAL WINDOW (0) | Between 2 V and 3 V |
| SIGNAL WINDOW (1) | Between 3 V and 4 V |
| SIGNAL WINDOW (2) | Between 4 V and 4.75 V |

*FIG. 3*

REAR STEERING SENSOR DIAGNOSTIC ALGORITHM FOR FOUR-WHEEL STEERING SYSTEMS

CROSS-REFERENCE TO RELATED APPLICATIONS

This application claims the benefit of U.S. Provisional Application No. 60/309,434, filed Aug. 1, 2001, the contents of which are incorporated by reference herein in their entirety.

BACKGROUND

In vehicular applications, a typical four-wheel steering system steers the front and the rear wheels of a vehicle. More specifically, a rear-wheel steering portion of the system may produce a desired rear-wheel steering angle to improve maneuverability at low speeds. The low speed steering method may achieve tight turning radii at low speeds by steering the front and rear wheels in different directions to thereby reduce the effective turning radius of the vehicle. In the rear-wheel steering portion of a four-wheel steering system, an electric motor is typically employed to steer the rear wheels. The position of the rear steering mechanism may be determined with a sensor.

SUMMARY

The above described and other features are exemplified by the following Figures and Description in which a vehicular diagnostic system is disclosed that controls the rear steering angle of a vehicle by receiving a plurality of signals indicative of rear steering angle; checking at least one of the plurality of signals to determine if it falls within a valid range; correlating at least a first signal of the plurality of signals with at least a second signal of the plurality of signals to determine if either the first signal or the second signal is invalid; and rejecting any signals found to be invalid.

BRIEF DESCRIPTION OF THE DRAWINGS

Exemplary embodiments will now be described by way of example with reference to the accompanying drawings wherein like reference numerals designate like features in the several figures, in which:

FIG. 3 is a sensor signal correlation table for the four-wheel steering system of FIG. 1.

DETAILED DESCRIPTION OF PREFERRED EMBODIMENTS

Figure 1:
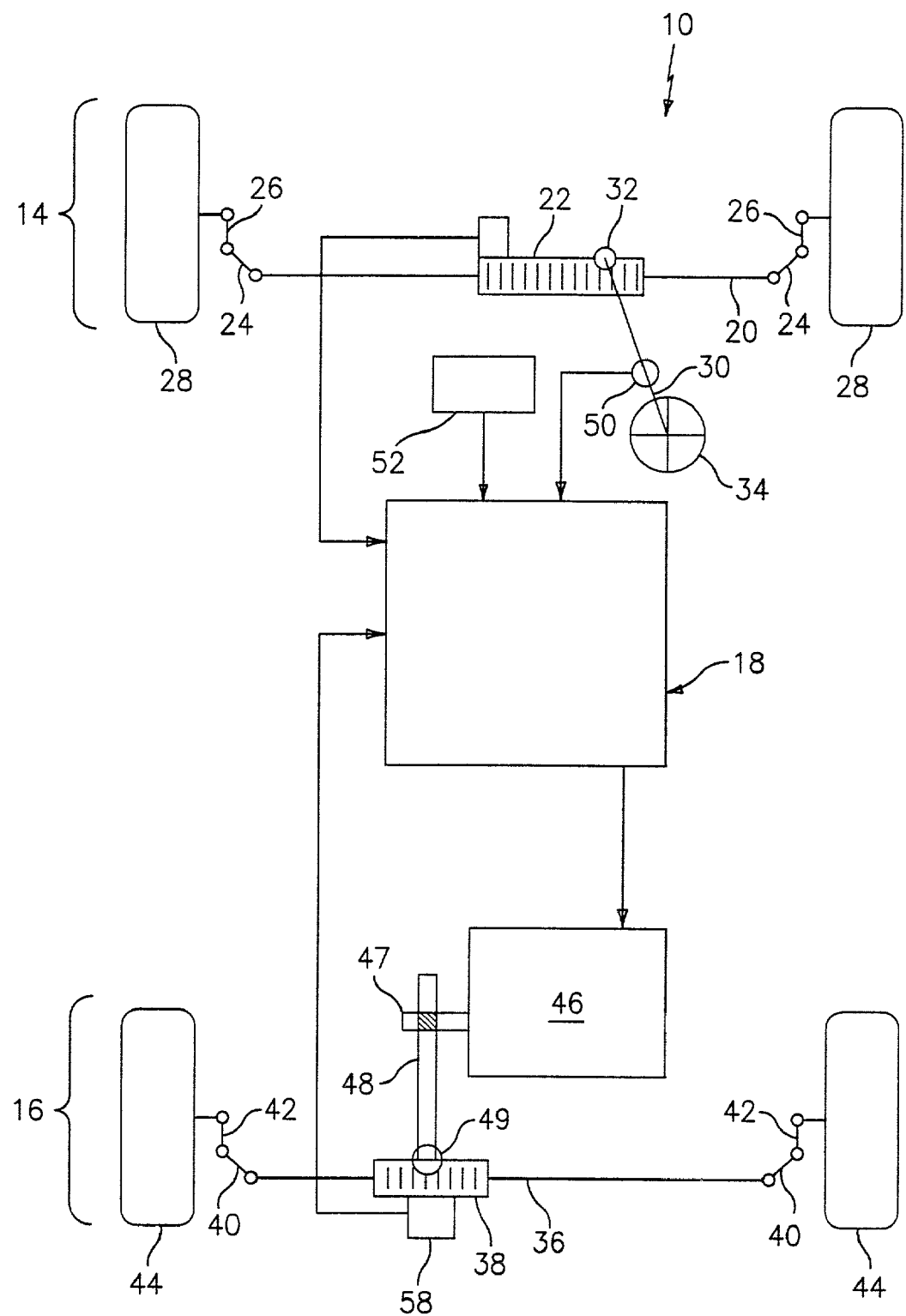
FIG. 1 is a schematic diagram of a vehicular four-wheel steering system.

As shown in FIG. 1, a vehicular four-wheel steering system is indicated generally by the reference numeral 10. The system 10 includes a controller 18 coupled to various sensors and interfaces for performing a variety of processes prescribed by the desired controlling functions.

The system 10 is incorporable into a vehicle (not shown) to provide enhanced steering and directional control of the vehicle. The system 10 comprises a front steering mechanism, shown generally at 14, a rear steering mechanism, shown generally at 16, and a controller 18 in signal communication with the front steering mechanism 14 and the rear steering mechanism 16. Although the system 10 is described as being applicable to a rack and pinion steering arrangement, the system 10 is adaptable to other steering arrangements including, for example, integral gear steering systems.

The front steering mechanism 14 comprises a rack shaft 20, a rack 22 disposed intermediately between opposing ends of the rack shaft 20, a tie rod 24 disposed on each opposing end of the rack shaft 20, a knuckle arm 26 connected to each tie rod 24, and a front steerable wheel 28 rotatably disposed on each knuckle arm 26. The rack shaft 20, tie rods 24, and knuckle arms 26 are configured such that the front steerable wheels 28 can pivot in unison relative to the vehicle to steer or to effect a change in the direction of travel while the vehicle is moving.

The front steering mechanism 14 further comprises a mechanism through which a vehicle operator can effectuate a desired change in the direction of travel of the vehicle. Such a mechanism comprises a steering column 30 disposed in operable communication at one end with the rack 22 through a pinion 32 and at an opposing end thereof with a steering device 34. The steering device 34 may be a hand steering wheel, or "hand-wheel". Manipulation of the steering device 34, i.e., rotation of the hand-wheel, causes the axial rotation of the steering column 30, which in turn causes the rotation of the pinion 32. Rotation of the pinion 32, through the engagement of the rack 22 and the pinion 32, effectuates the lateral translation of the rack 22 relative to the vehicle. The lateral translation of the rack 22 causes the front steerable wheels 28 to angle relative to the vehicle, thereby altering the direction of travel while the vehicle is moving.

The rear steering mechanism 16 comprises a rack shaft 36, a rack 38 disposed intermediately between opposing ends of the rack shaft 36, tie rods 40 disposed on each opposing end of the rack shaft 36, a knuckle arm 42 connected to each tie rod 40, and a rear steerable wheel 44 rotatably disposed on each knuckle arm 42. The rack shaft 36, tie rods 40, and knuckle arms 42 are configured such that rear steerable wheels 44, like the front steerable wheels 28, can be pivoted in unison relative to the vehicle to steer the vehicle upon lateral translation of the rack 38.

The rear steering mechanism 16 further comprises a mechanism through which the rear steerable wheels 44 can similarly be pivoted. Such a mechanism comprises a motor 46 operably connected to the rack 38 through a drive mechanism 48. The drive mechanism 48, through a pinion 49, transfers the rotational motion of a rotor shaft 47 of the motor 46 to linear motion of the rack 38, which effectuates the lateral motion of the rack shaft 36 and, ultimately, the pivoting of the rear steerable wheels 44.

The vehicle is further provided with a steering sensor 50 for detecting an angular position of the steering column 30, a vehicle speed sensor 52, and a rear rack shaft displacement sensor 58. The rear rack shaft displacement sensor 58 detects the displacement of its corresponding rack shaft 36 from a reference position, which is the position in which each rear steerable wheel 44 is aligned and rotatable.

The controller 18 is disposed in signal communication with vehicular systems. The controller 18 receives informational signals from each of the systems, quantifies the received information, and provides an output command signal in response thereto, such as in this instance, for example, to the rear steering mechanism 16 through the motor 46.

In order to perform the prescribed functions and desired processing, as well as the computations therefore (e.g., the execution of the rear-wheel steering algorithms, and the like), the controller 18 may include, but need not be limited to, processors, computers, memory, storage, registers, timing devices, interrupts, communication interfaces, input/output signal interfaces, and the like, as well as combinations comprising at least one of the foregoing. For example, the controller 18 may include input signal filtering to enable accurate sampling and conversion or acquisition of such signals from communications interfaces.

Figure 2:
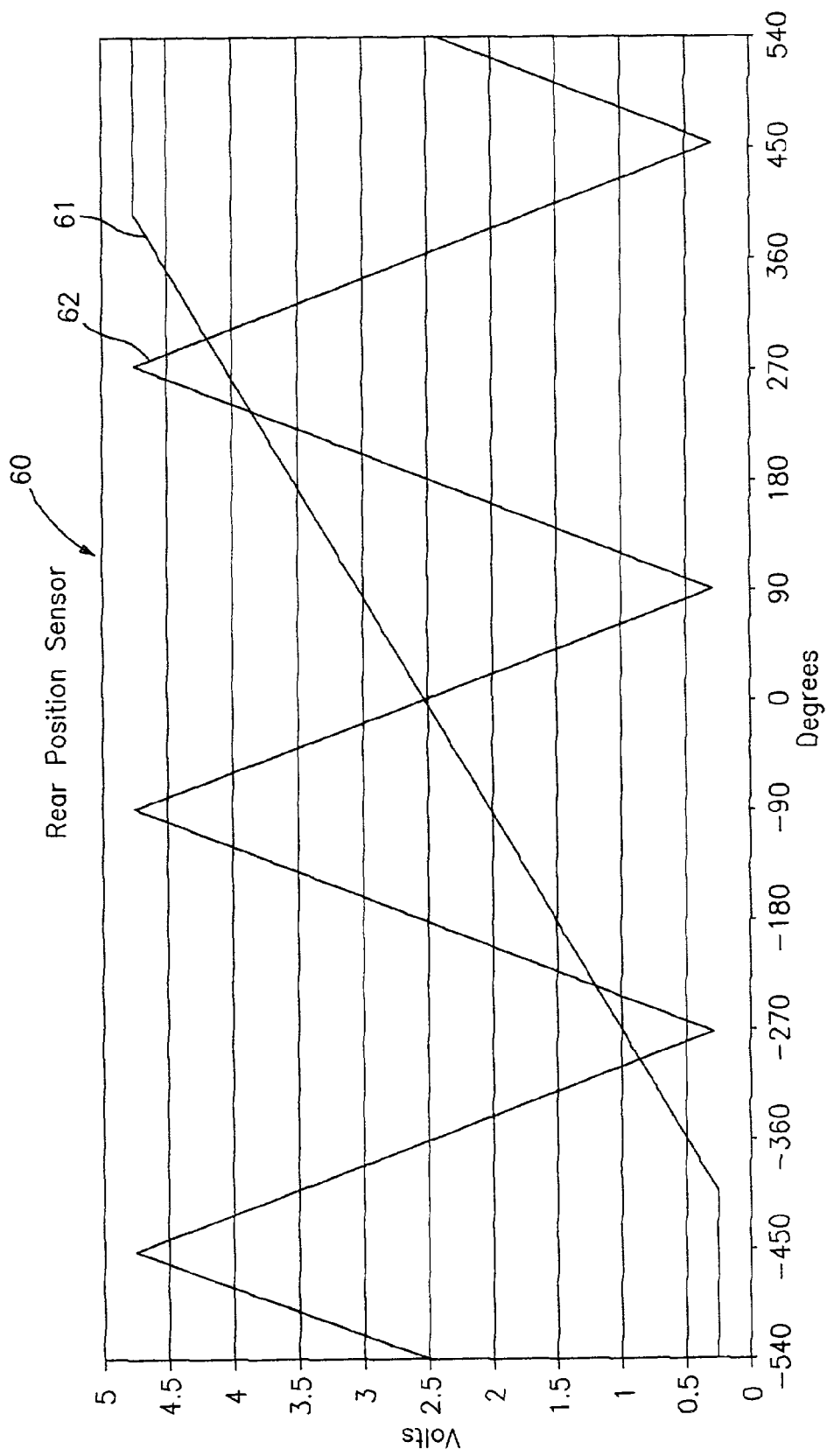
FIG. 2 is a sensor signal correlation plot for the four-wheel steering system of FIG. 1.

Referring now to FIG. 2, the rear-wheel angle is measured by a rear-wheel-angle sensor that produces output signals according to the plot 60, including a first signal 61 and a second signal 62. The first signal 61 is an absolute signal versus rotation angle, also called "signal-1" and "RWA1". The second signal 62 is a relative signal versus rotation angle, also called "signal-2" and "RWA2". The diagnostics implemented in this algorithm determine whether signal-1 and signal-2 are each in a specified valid range. This protects the system 10 from using potentially invalid sensor signals that are shorted to battery, shorted to ground, or open. The algorithm also checks the correlation between signal-1 and signal-2 to determine whether the signals are shorted to each other or otherwise incongruent. As shown, signal-2 can be of the same value as signal-1 at a single distinct angle in each of the five window ranges, which span uniquely resolvable rear-wheel steering angles between about negative 405 degrees and positive 405 degrees.

As shown in FIG. 3, a table 66 indicates exemplary values for signal-1 and signal-2 for rear-wheel angles between about negative 540 degrees and positive 540 degrees. The rear-wheel angle may be resolved to the accuracy of the potentially higher resolution signal (signal-2) by selection of the window range corresponding to the value of the potentially lower resolution signal (signal-1). Thus, this strategy protects the system from providing an unintended rear steer for conditions of the sensor's signal-1 and signal-2 being shorted to each other, ground or battery, and from open circuit conditions.

Figure 4:
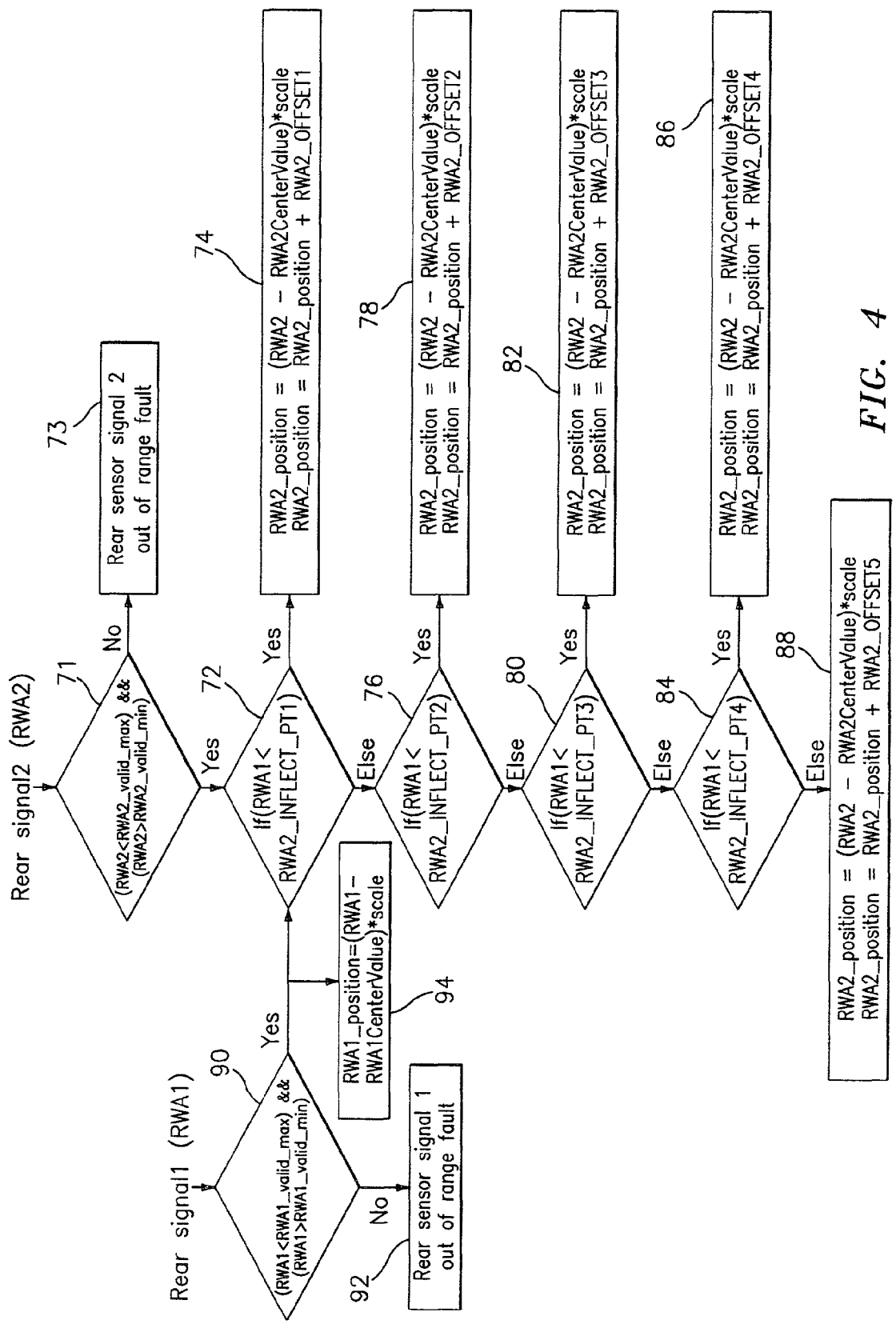
FIG. 4 is a flow diagram illustrating a method for controlling the rear steering angle of the four-wheel steering system of FIG. 1.

Turning now to FIG. 4, a rear sensor correlation function is indicated generally by the reference numeral 70. The inputs from the sensor are signal-1 and signal-2, which typically vary with time. The function 70 includes a decision block 71 for determining whether the value of the second rear-wheel angle signal (signal-2) is within a valid range by checking that signal-2 is less than a valid maximum value of 4.925V and greater than a valid minimum value of 0.075V. It may be understood by those of ordinary skill in the pertinent art, that this and other valid ranges may be adjusted in order to meet design criteria. For example, an alternate exemplary embodiment may have a valid range for signal-1 of 0.25 Volts to 4.75 Volts, and a valid range for signal-2 of 0.5 Volts to 4.5 Volts.

If signal-2 is not within the valid range, typically indicating that a short to battery or a grounded output has occurred, a function 73 produces a signal indicative of a rear sensor signal-2 out-of-range fault. If, on the other hand, signal-2 is determined to be within a valid range, control is passed to a decision block 72 for determining whether the value of the first rear-wheel angle signal (signal-1) is less than its value at a first inflection point of the second rear-wheel angle signal.

The first inflection point is the first and lowest of four consecutively enumerated inflection points between the uniquely resolvable rear-wheel angles of +/−405 degrees. In this exemplary embodiment, the four inflection points correspond to RWA1 signal voltage values of 1.0V, 2.0V, 3.0V and 4.0V, respectively. If the first value of signal-1 is less than its value at the inflection point, then the position corresponding to the second rear-wheel angle signal (signal-2) is determined by function 74 by subtracting a second rear-wheel angle center value from the second rear-wheel angle signal (signal-2), multiplying the difference by a scale factor to convert volts to degrees, and adding a second rear-wheel angle offset corresponding to the first inflection point.

The second rear-wheel angle center value is determined during an initial wheel alignment, at which time both signal-1 and signal-2 will typically approach 2.5 volts. Accordingly, the center value will typically approach zero degrees or 2.5 volts, but may be some value other than zero degrees due, for example, to tolerances in the build and/or mechanical installation of a given vehicle. If, on the other hand, the condition of decision block 72 is false, then a decision block 76 determines whether the value of the first rear-wheel angle signal (signal-1) is less than its value at a second inflection point, −90 degrees here, of the second rear-wheel angle signal. If the first value of signal-1 is less than its value at the second inflection point, then the position corresponding to the second rear-wheel angle signal (signal-2) is determined by function 78 by subtracting a second rear-wheel angle center value from the second rear-wheel angle value, multiplying the difference by a scale factor, and adding a second rear-wheel angle offset corresponding to the second inflection point. The sign of the scale factor alternates for adjacent windows, and is about −180/4.5 for windows −2, 0, and 2; and +180/4.5 for windows −1 and 1 in this exemplary embodiment.

The offsets corresponding to the inflection points are −360, −180, 0, 180 and 360 degrees, respectively. For example, if the actual rear-wheel angle is negative 180 degrees, signal-1 should be about 1.5V (see FIG. 2) corresponding to signal window(−1) (see FIG. 3) and signal-2 (RWA2) should be about 2.5V (see FIG. 2), so block 78 would calculate the rear-wheel angle position based on the RWA2 signal to be (RWA2−RWACenterValue)*Scale+RWA_OFFSET2=(2.5−2.5)*(180/4.5)+(−180)=−180 degrees. For an actual rear-wheel angle of negative 200 degrees, signal-1 should be about 1.4V (see FIG. 2) corresponding to signal window(−1) (see FIG. 3) and signal-2 (RWA2) should be about 2V (see FIG. 2), so block 78 would calculate the rear-wheel angle position based on the RWA2 signal to be (RWA2−RWACenterValue)*Scale+RWA_OFFSET2=(2−2.5)*(40)+(−180)=−200 degrees.

If the condition of decision block 76 is false, then a decision block 80 determines whether the value of the first rear-wheel angle signal (signal-1) is less than its value at a third inflection point of the second rear-wheel angle signal. If the first value of signal-1 is less than its value at the inflection point, then the position corresponding to the second rear-wheel angle signal (signal-2) is determined by function 82 by subtracting a second rear-wheel angle center value from the second rear-wheel angle value, multiplying the difference by a scale factor, and adding a second rear-wheel angle offset corresponding to the third inflection point.

If the condition of decision block 80 is false, then a decision block 84 determines whether the value of the first rear-wheel angle signal (signal-1) is less than its value at a fourth inflection point of the second rear-wheel angle signal. If the first value of signal-1 is less than its value at the inflection point, then the position corresponding to the second rear-wheel angle signal (signal-2) is determined by function 86 by subtracting a second rear-wheel angle center value from the second rear-wheel angle value, multiplying the difference by a scale factor, and adding a second rear-wheel angle offset corresponding to the fourth inflection point.

If, on the other hand, the condition of decision block 84 is false, then the position corresponding to the second rear-wheel angle signal is determined by function 88 by subtracting a second rear-wheel angle center value from the second rear-wheel angle value, multiplying the difference by a scale factor, and adding a second rear-wheel angle offset corresponding to the fifth inflection point.

A decision block 90 is used for determining whether the value of the first rear-wheel angle signal (signal-1) is within a valid range by checking that signal-1 is less than a valid maximum value of 4.925V and greater than a valid minimum value of 0.075V. If signal-1 is not within the valid range, typically indicating that a short to battery or a grounded output has occurred, a function 92 produces a signal indicative of a rear sensor signal-1 out-of-range fault. If, on the other hand, signal-1 is determined to be within a valid range, the position corresponding to the first rear-wheel angle signal is determined by function 94 by subtracting a first rear-wheel angle center value from the first rear-wheel angle value, and multiplying the difference by a scale factor and control is passed to the decision block 72, described above.

Thus, the rear-wheel signal correlation diagnostics compare the first signal ("signal-1") with the second signal ("signal-2"). Since signal-2 is a saw tooth waveform, a particular value of signal-2 does not absolutely determine the exact angle value. Depending on the value of rear sensor signal-1, five regions for the rear sensor signal-2 are defined by four inflection points, as follows: RWA2_INFLECT_PT1=1.00V; RWA2_INFLECT_PT2=2.00 V; RWA2_INFLECT_PT3=3.00 V; and RWA2_INFLECT_PT4=4.00 V, respectively, for the first through fourth inflection points.

An angle offset corresponding to each region defined by the inflection points has to be added to the relative value of signal-2, and is determined based on each region as follows: RWA2_OFFSET1=−360 sensor degrees; RWA2_OFFSET2=−180 sensor degrees; RWA2_OFFSET3=0 sensor degrees; RWA2_OFFSET4=180 sensor degrees; and RWA2_OFFSET5=360 sensor degrees, respectively, for the first through fifth regions.

Once the rear position value is calculated for each of signal-1 and signal-2, as discussed above, the rear sensor correlation diagnostic determines whether the two signals correlate by comparing the signals and determining that they each correlate or fall within a predetermined threshold tolerance of each other, such as, for example, within 40 degrees of each other. Thus, the diagnostic will be triggered when the comparison value is above the threshold tolerance, or above 40 degrees in this exemplary embodiment.

Accordingly, the four-wheel steering system 10 uses the rear sensor 58 mounted on the pinion to measure the absolute position of the rear wheels. The rear sensor provides two signals; signal-1 may be used for initialization, and signal-2 may be used for more accurate measurement. If the sensor signals were intermittent, shorted to ground, shorted to battery, shorted to each other or open, it might cause the reading to be corrupted and hence the rear-wheel angle estimation to be incorrect. This diagnostic algorithm will detect any of these conditions, thus preventing an unintended steer.

The above-described methodology provides a diagnostic algorithm for detecting erroneous rear-wheel steering angle signals. In addition, the present teachings may be embodied in the form of computer-implemented processes and apparatuses for practicing those processes. The present teachings can also be embodied in the form of computer program code containing instructions embodied in tangible media, such as floppy diskettes, CD-ROMs, hard drives, or any other computer-readable storage media, wherein, when the computer program code is loaded into and executed by a computer, the computer becomes an apparatus for practicing the teachings of the present disclosure.

The teachings of the present disclosure can be embodied in the form of computer program code, for example, whether stored in a storage medium 100 communicated with controller 18, loaded into and/or executed by a computer, or as data signal transmitted, whether by a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the teachings herein. When implemented on a general-purpose microprocessor, the computer program code segments configure the microprocessor to create specific logic circuits.

While the disclosure has been made with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for validating a rear steering angle of a vehicle, comprising:
   receiving a plurality of signals indicative of said rear steering angle;
   checking at least one of said plurality of signals to determine if it falls within a valid range;
   correlating at least a first signal of said plurality of signals with at least a second signal of said plurality of signals to determine if either said first signal or said second signal is invalid; and
   signaling a rejection if any of said plurality of signals is found to be invalid.

2. A method as defined in claim 1, said correlating comprising:
   calculating a steering angle corresponding to one of said first signal and said second signal so as to create a calculated angle; and
   computing an expected value of the other of said first signal and said second signal in accordance with said calculated angle.

3. A method as defined in claim 2, said correlating further comprising:
   comparing said expected value of said other of said first signal and said second signal with an actual value of said other of said first signal and said second signal.

4. A method as defined in claim 3, said correlating further comprising:
   determining that any of said plurality of signals is invalid if said expected value and said actual value are not substantially equivalent.

5. A method as defined in claim 2, wherein at least one of said calculating and said computing further comprises using a look-up table.

6. A method as defined in claim 2, wherein at least one of said calculating and said computing further comprises evaluating a continuous function.

7. A method as defined in claim 1, wherein said checking further comprises:
   comparing at least one of said plurality of signals with an upper limit; and comparing at least one of said plurality of signals with a lower limit.

8. A method as defined in claim 1, wherein said plurality of signals comprises a plurality of signal components of a single carrier signal.

9. A method as defined in claim 1, wherein said receiving further comprises providing a single sensor having two signal outputs.

10. A method for validating a rear steering angle of a vehicle, comprising:
   receiving a plurality of signals indicative of said rear steering angle;
   checking at least one of said plurality of signals to determine if it falls within a valid range;
   correlating at least a first signal of said plurality of signals with at least a second signal of said plurality of signals to determine if either said first signal or said second signal is invalid;
   signaling a rejection if any of said plurality of signals is found to be invalid, wherein said correlating includes comparing said first signal with an expected value at about an inflection point of said second signal.

11. A method as defined in claim 10, said correlating further comprising:
   adding a second rear-wheel angle offset corresponding to said inflection point to a signal corresponding to said second signal in response to said comparing.

12. A method as defined in claim 11, said correlating further comprising:
   subtracting a center value from said second signal; and
   multiplying a result of said subtracting by a scale factor.

13. A method as defined in claim 11, further comprising:
   computing said expected value with reference to a look-up table.

14. A method as defined in claim 11, further comprising:
   computing said expected value by evaluating a continuous function.

15. A rear steering system for a vehicle, comprising:
   at least one actuator in operable communication with a pair of rear wheels; and
   a controller operably interconnected with said actuator;
   means for receiving a plurality of signals indicative of a rear steering angle of said rear wheels;
   means for checking at least one of said plurality of signals to determine if it falls outside a valid range and is invalid;
   means for correlating at least a first signal of said plurality of signals with at least a second signal of said plurality of signals to determine if either said first signal or said second signal is invalid; and
   means for signaling a rejection if any of said plurality of signals are found to be invalid.

16. A method for determining a steering angle comprising:
   receiving a plurality of signals indicative of said steering angle;
   checking at least one of said plurality of signals to determine if it falls within a valid range;
   correlating at least a first signal of said plurality of signals with at least a second signal of said plurality of signals to determine that neither said first signal nor said second signal is invalid;
   determining a first value of said steering angle in accordance with said first signal; and
   determining a second value of said steering angle in accordance with said first value of said steering angle and said second signal in order to obtain a more accurate measurement.

* * * * *